April 7, 1925.

J. G. FAY 1,532,532

COMBINED SPARE TIRE RIM CARRIER AND REMOVER

Filed Aug. 7, 1922

INVENTOR:
Joseph G. Fay
BY
Pierre Barnes
ATTORNEY

Patented Apr. 7, 1925.

1,532,532

UNITED STATES PATENT OFFICE.

JOSEPH G. FAY, OF SEATTLE, WASHINGTON, ASSIGNOR OF ONE-FOURTH TO JAMES K. McDOWALL, OF SEATTLE, WASHINGTON.

COMBINED SPARE-TIRE-RIM CARRIER AND REMOVER.

Application filed August 7, 1922. Serial No. 580,026.

*To all whom it may concern:*

Be it known that I, JOSEPH G. FAY, a citizen of the United States, residing at Seattle, in the county of King and State of Washington, have invented certain new and useful Improvements in Combined Spare-Tire-Rim Carriers and Removers, of which the following is a specification.

This invention relates to carriers and contracting devices for spare-tire rims of automobiles or other vehicles, and its object is to provide a simple and efficient device of this character.

Other objects and advantages of the invention will appear in the following description.

In the accompanying drawings,—

Figures 2, 3:
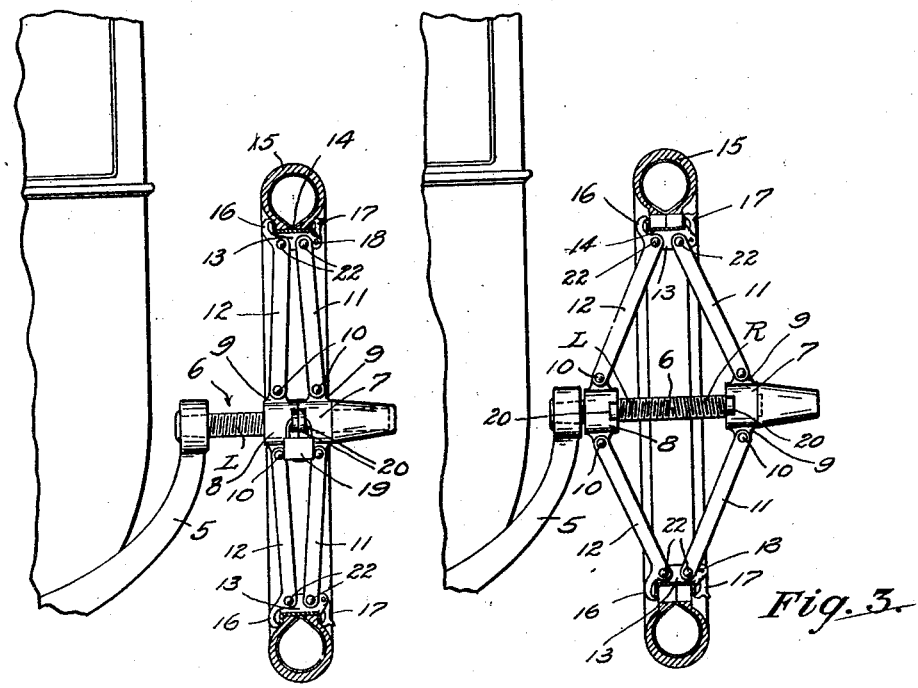
Figures 1, 4:
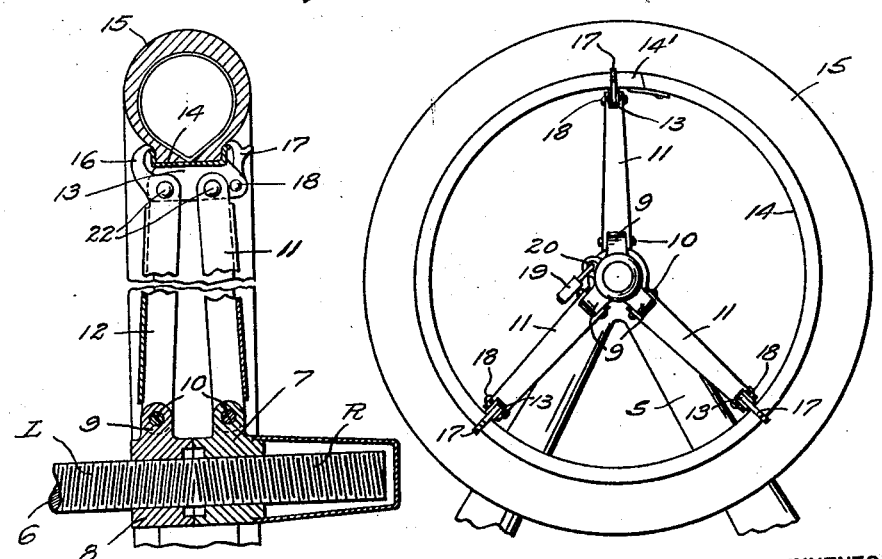

Figure 1 is a rear elevational view of an embodiment of the present invention. Fig. 2 is a view partly in side elevation and partly in longitudinal section of the same shown applied to the rear end of an automobile. Fig. 3 is a similar view with the movable parts illustrated in different operative positions from those in which they are represented in Fig. 2. Fig. 4 is a longitudinal sectional view of parts shown in Fig. 2 to an enlarged scale.

In said drawings, the reference numeral 5 represents a frame or bracket rigidly secured to the rear end of an automobile and serving as a support for a rearwardly extending mandrel 6 which is disposed horizontally, or nearly so.

The mandrel 6 is provided with right and left hand screw threaded portions R and L which are engageable in correspondingly threaded nuts or hub elements 7 and 8.

These hubs are provided about their peripheries with apertured ears 9 to receive pins 10 which serve to pivotally connect the inner ends of spokes 11 and 12 to the respective hubs.

Said spokes are disposed radially of the hub's axis, the outer ends of said spokes being pivotally connected by pins 22 to block members 13 which are engageable against the inner periphery of a wheel rim 14 for a spare pneumatic tire 15.

The rim 14 is of the split demountable-type of known construction and is capable of being contracted for the removal and replacement of a tire by drawing one of the ends thereof, as 14¹, toward the axis of the rim. For which purpose the members 13 are provided at their front and rear sides respectively with hooks 16 and 17 of which the former, 16, may be formed as extensions of the spokes 12, the other hooks 17 being pivotally connected by pins 18 to the respective members.

A rim 14 is mounted upon said members when the latter are in their retracted positions, see Fig. 3, and by then suitably revolving the assembly of members, spokes and hubs about the axis of the mandrel, the screw threads of the mandrel act to cause the complementary hubs 7 and 8 to be drawn toward each other to effect outward movements of the members 13 into clamping relations with the inner periphery of the rim, as represented in Figs. 1, 2 and 4.

With the parts thus arranged, said members are secured against withdrawal from the rim as by means of a padlock 19 engaging apertured lugs 20 of said hubs.

To contract the rim for the removal of the tire 15 therefrom the hooks 17 must be engaged over one end of the rim to cooperate with the hooks 16 engaging its other end and then suitably rotating the rim to transmit rotary motion to the hubs whereby the screw threads on the mandrel will effect the separation of the hubs to draw said members and the attached rim inwardly from the tire to enable the latter being removed independently of the rim.

By disengaging the hooks 17 when the members 13 are in their outermost positions, said members may be withdrawn from the rim to allow the rim and tire being removed as a single piece from the carrier.

The operation of the invention will, it is believed, be understood from the foregoing description.

While I have illustrated and described the tire carrier and rim contracting device in its preferred construction I do not wish to be understood as limiting myself specifically thereto as changes may be made without departing from the invention as defined by the following claims.

What I claim, is,—

1. In a combined carrier and contracting device for a demountable rim, a non-rotatable mandrel having right and left hand screw threads thereon, a rim carrier comprising two internally threaded hub elements mounted upon said mandrel and engaging the respective threads thereof, rim-engaging members, spokes connected to the respective hubs and members, and hook devices carried by said members for detachably connecting a rim thereto.

2. A combined contracting device and carrier for a demountable wheel-rim, comprising a non-rotatable mandrel provided with right and left hand screw threads, means connected to an automobile and secured to said mandrel for supporting the same in a substantially horizontal position, hubs mounted upon said mandrel and provided with internal right and left hand screw threads for engagement with the respective screw threads of said mandrel and movable axially of the latter by rotating said hubs, pairs of complementary spokes pivotally connected at their inner ends to said hubs, a member pivotally connected to the outer ends of each pair of complementary spokes, and hooks carried by the respective members and engageable over the outer periphery of a wheel-rim.

3. A combined contracting device and carrier for a demountable wheel-rim, comprising a non-rotatable mandrel provided with right and left hand screw threads, means connected to an automobile and secured to said mandrel for supporting the same in a substantially horizontal position, hubs mounted upon said mandrel and provided with internal right and left hand screw threads for engagement with the respective screw threads of said mandrel, pairs of complementary spokes pivotally connected at their inner ends to said hubs, a rim-engaging hook element provided on one spoke of each pair thereof, a member pivotally connected to each pair of complementary spokes, a hook provided on each of the respective members and engageable over the outer periphery of a wheel-rim, and means for coupling said hubs together for releasably retaining said members in their outermost positions.

4. On an automobile, the combination of a demountable wheel rim, a non-rotatable mandrel having right and left hand screw threads thereon, a rim carrier rotatable upon said mandrel, said carrier comprising two internally threaded hub elements mounted upon said mandrel, rim-engaging members, spokes pivotally connected to the respective hubs and members, hook devices carried by said members for detachably connecting said rim thereto, and fastening means engageable with both of said hub elements for releasably coupling the same together.

5. A combined contracting device and carrier for a demountable wheel rim, comprising a non-rotatable mandrel provided with right and left hand screw threads, means adapted to be connected to an automobile for supporting said mandrel internally screw threaded hubs mounted upon the mandrel and engaging the respective threads thereof, pairs of complementary spokes connected at their inner ends to said hubs, a member carried by the outer ends of each pair of spokes, a pair of rim engageable hooks pivotally connected to each of said members, one hook of each pair being rigid with one of the associated spokes.

Signed at Seattle, Washington, this 29th day of July, 1922.

JOSEPH G. FAY.

Witness:
PIERRE BARNES.